United States Patent [19]
Edens

[11] 3,747,946
[45] July 24, 1973

[54] TOOL HOLDERS
[76] Inventor: Ralph A. Edens, 1007 Lochmoor, Grosse Pointe Woods, Mich. 48236
[22] Filed: Dec. 21, 1970
[21] Appl. No.: 100,224

[52] U.S. Cl. .................................. 279/81, 279/1 B
[51] Int. Cl. .............................................. B23q 3/00
[58] Field of Search ...................... 279/1 B, 76, 79, 279/80, 81

[56] References Cited
UNITED STATES PATENTS
2,731,273  1/1956  Edens .................................. 279/81

Primary Examiner—Francis S. Husar
Attorney—Everett G. Wright

[57] ABSTRACT

An improvement in quick-lock and quick-release tool holders wherein a compound locking cam and related locking elements are provided which initially lock a tapered shank cutting tool or the like into a complementarily formed holder by a primary manual cam lock followed by a contiguous secondary relatively flat preferably wrench-actuated cam lock whereby to provide more positive and rugged locking than heretofore possible, which compound cam lock is not only more rugged and positive than the heretofore single cam lock, but provides an improved quick-lock and quick-release action together with permitting rotation in main drive and reverse drive directions.

1 Claim, 6 Drawing Figures

INVENTOR.
RALPH A. EDENS

BY *Everett G Wright*

ATTORNEY

INVENTOR.
RALPH A. EDENS

BY Everett G. Wright
ATTORNEY

TOOL HOLDERS

BACKGROUND OF THE INVENTION

The field of the invention is in tapered "non-freezing" or "non-binding" cutting tool holders which firmly and accurately engage complementarily tapered shanked cutting tools.

This invention is an improvement over the invention disclosed and claimed in an earlier U. S. Pat. No. 2,731,273 for TOOL HOLDERS issued Jan. 17, 1956 to Ralph A. Edens.

SUMMARY OF THE INVENTION

The instant invention relates to an improved tapered tool holder for tapered shank cutting tools and the like wherein the tool holder employs, in addition to other locking elements, a compound cam lock consisting of a primary relative rapid-rise cam employed for initial manual securement of the tapered shanked cutting tool in the female taper of the tapered tool holder and a contiguous secondary relatively slow-rise cam which is employed for final positive manual wrench securement of the cutting tool within the tool holder.

Figure 1:
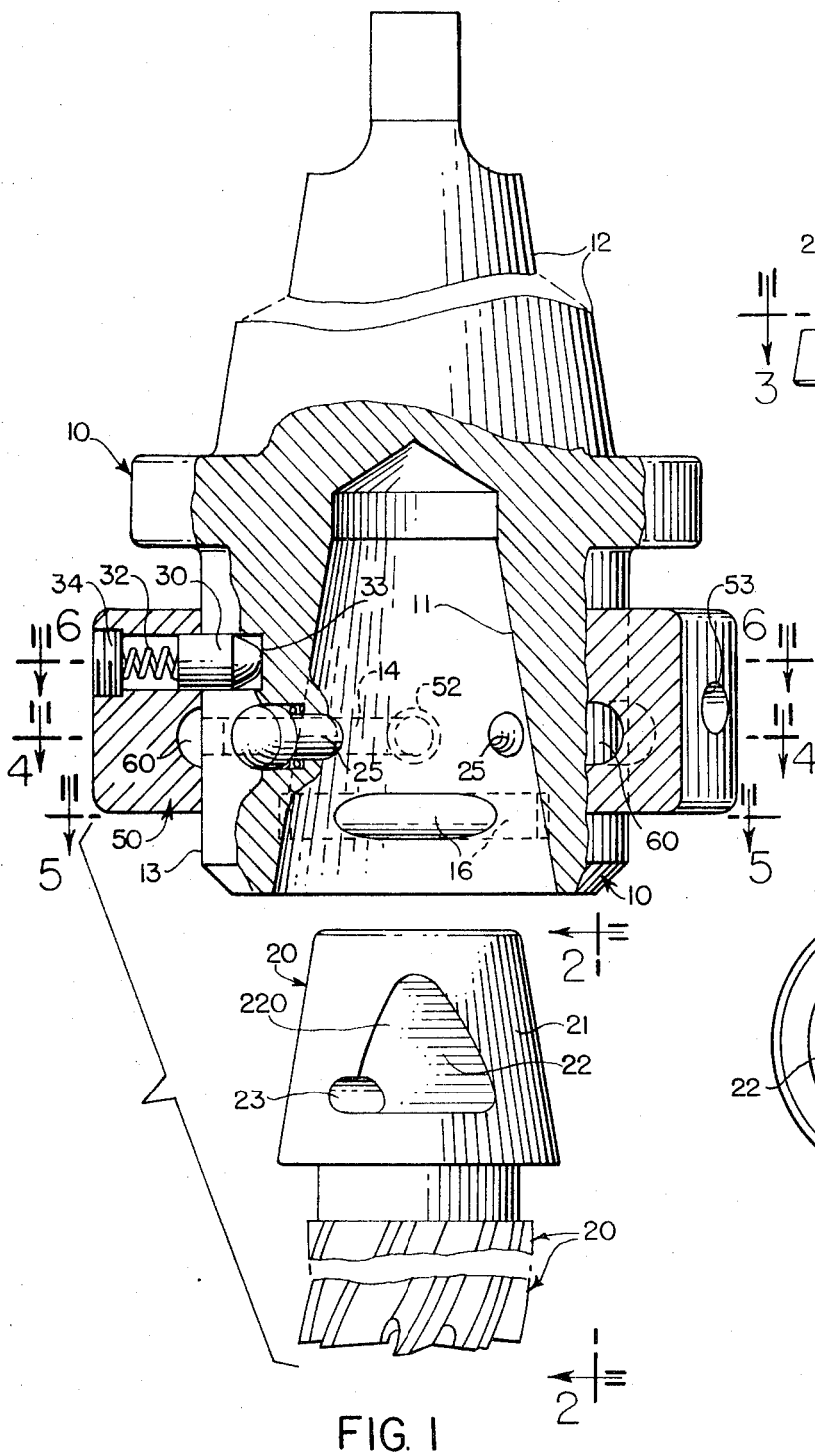
FIG. 1 is a partially exploded vertical elevational view of a tool holder and tapered shanked cutting tool embodying the instant invention, taken on the line 1—1 of FIG. 4, portions being broken away as indicated.
Figure 2:
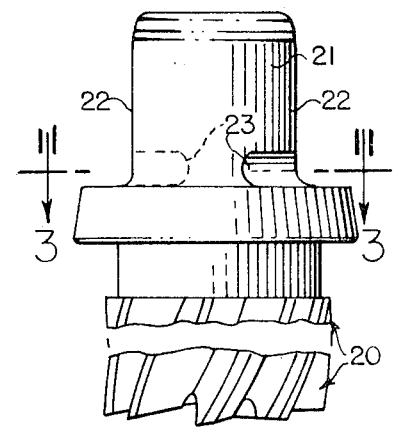
FIG. 2 is an elevational view of the tapered shank cutting tool taken on the line 2—2 of FIG. 1.
Figure 3:
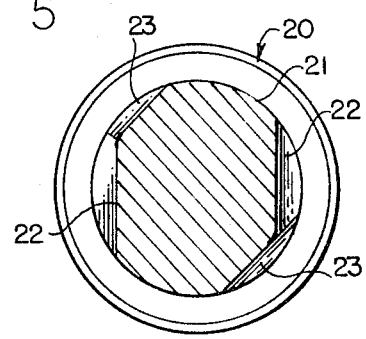
FIG. 3 is a horizontal sectional view taken on the line 3—3 of FIG. 2.

Referring now to the drawings wherein like reference characters refer to like and corresponding parts throughout the several views, the particular embodiment of the invention disclosed for illustrative purposes comprises the combination of a tool holder 10 having a female taper 11 formed axially in the lower end thereof to receive the complementarily tapered male shank 21 of a cutting tool 20. The said tool holder 10 and cutting tool 20 incorporates therein a compound cam-lock mechanism and other related locking elements hereinafter described in detail for firmly and positively releasably locking the said cutting tool 20 within the tool holder 10 for rotation thereby in main drive and reverse drive directions. The said cutting tool holder 10 is preferably provided with a suitable tapered drive shank 12 or other suitable formation at its upper end to permit it to be chucked into the head or spindle (not shown) of a machine tool or the like for rotation thereby in either direction.

Figure 4:
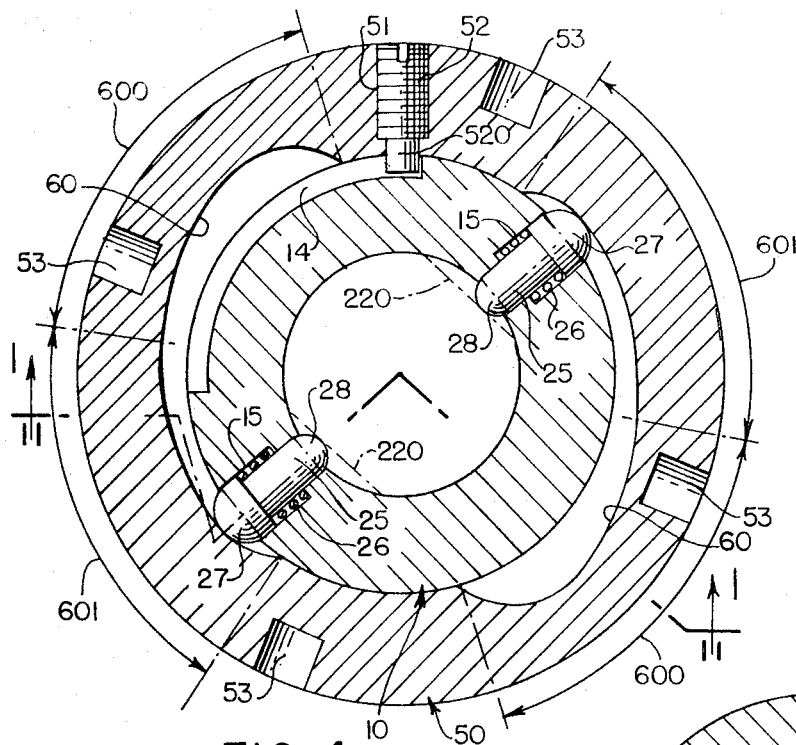
FIG. 4 is a horizontal sectional view taken on the line 4—4 of FIG. 1.

The lower portion 13 of the tool holder 10 is preferably cylindrical in shape to receive in turnable telescopic relationship thereover a cam lock ring 50. As best shown in FIG. 4, a radially disposed threaded and shouldered bore 51 is preferably provided in the cam lock ring 50 into which is threaded a cam lock ring retainer element 52 having a retainer pin 520 extending radially inwardly from the said cam lock ring 50 into a cam lock ring retainer groove 14 formed along approximately a 90° quadrant of the outer periphery of the lower cylindrical portion 13 of the said tool holder 10. The angular relationship between the said retainer pin 520 and the retainer groove 14 in the tool holder element 10 is such that the cam lock ring 50 may be turned approximately 90° from a fully unlocked position (not shown) to its fully locked position as shown.

With continued reference to FIG. 4, a pair of diametrically oppositely disposed compound locking cams 60 are formed in the inner periphery of the cam lock ring 50 which are engaged by diametrically oppositely disposed reciprocating locking pins 25 carried by the cylindrical lower portion 13 of the tool holder 10, the said reciprocating locking pins 25 being constantly urged radually outwardly by suitable compression springs 26. Each of the said reciprocating locking pins 25 is reciprocably positioned through a suitably shouldered bore 15 in the tool holder 10, and a semi-spherical cam head 27 and semi-spherical locking head 28 at opposite ends thereof. The said cam heads 27 of the locking pins 25 are each constantly and simultaneously spring urged by a compression spring 26 radially outwardly in and against the said diametrically disposed compound locking cams 60 formed within the female taper 11 of the tool holder 10.

Each of the oppositely disposed compound locking cams 60 of the cam lock ring 50 has a rapid-rise portion 600 and a contiguous slow-rise portion 601 as best shown in FIG. 4, each said rapid-rise portion 600 being so located that its deep end substantially freely overlies the cam head 27 of one of the reciprocating locking pins 25 carried by the tool holder 10 when the cam lock ring 50 is turned to its unlocked position. By hand turning the said cam lock ring 50 manually from its unlocked position toward its locked position, the locking pins 25 travel counterclockwise as viewed in FIG. 4 from their unlocked position up the rapid-rise slope of the rapid-rise portion 600 of the compound locking cam 60 until the locking pin 25 arrives at the relative slow-rise portion of the same compound locking cam. At or about this point, the rapid-rise portion 600 of the compound cam 60 tapers into smooth abutment with the contiguous slow-rise portion 601 thereof, and the tapered shank 21 of the cutting tool 20 becomes reasonably well engaged in the female tool holder taper 11 of the tool holder 10. When at this position, a C-wrench (not shown) is engaged in one of the wrench apertures 53 of the cam lock ring 50, and the cam lock ring is wrench turned in its locking direction to refusal, whereupon the cutting tool 20 is completely and positively locked in the tool holder 10.

Referring now to FIGS. 1, 2, 3 and 5, the male tapered shank 21 of the cutting tool 20 is provided with flat surfaces 22 on opposite sides thereof which are preferably parallel to the longitudinal axis of the said cutting tool 20. Cams 23 are formed in the tapered shank 21 of the cutting tool 20 at the base of the said flat surfaces 22 thereof, which cams 23 extend clockwise as viewed in FIG. 3 circumferentially from said flat surface 22 partially around said tapered shank 21.

Figure 5:
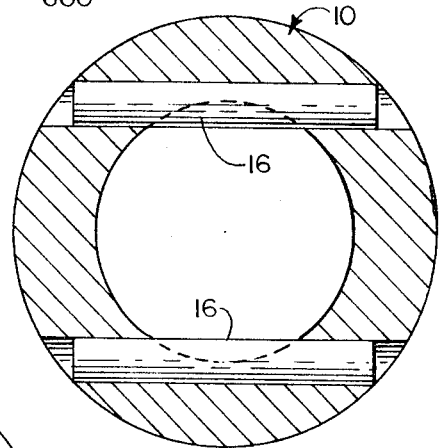
FIG. 5 is a horizontal sectional view taken on the line 5—5 of FIG. 1.

The cams 23 of the tapered shanked tool 20 engage the fixed opposite parallel locking pins 16 of the tool holder 10 shown in FIGS. 1 and 5. These parallel fixed locking pins 16 firmly hold the male tapered shanked tool 20 in the female taper 11 of the said tool holder 10 after the said tool 20 is positioned in the tool holder 10 and turned clockwise as viewed from the bottom of the tool 20. In this position, a counterclockwise rotation of the tool holder 10 as viewed from the bottom thereof drives the said cutting tool 20 counterclockwise with the cams 23 of the said tool 20 in engagement with the fixed parallel locking pins 16 of the tool holder 10. When the said tool 20 is thus positioned in the tool holder 10, the upper portion 220 of the flat surfaces 22 of the tool 20 are located angularly opposite the longitudinal axis of the semi-spherical locking heads 27 of the oppositely disposed reciprocating locking pins 25 as indicated by the dot and dash lines 220 in FIG. 4.

The cam lock ring 50 is then turned clockwise as viewed in FIG. 4 approximately 90° from its unlocked position (not shown) to its fully locked position as shown in FIG. 4 wherein oppositely disposed compound locking cams 60 formed therein engage the semi-spherical cam heads 27 of the locking pins 25 causing the locking heads 28 of the same locking pins 25 to engage the flat surface portions 22 formed on the tapered shank 21 of the cutting tool 20. The compound locking cams 60, being formed with a rapid-rise portion 600 and a slow-rise portion 601 permit the initial locking of the cutting tool 20 in the tool holder 10 to take place readily by first manually turning the cam lock ring 50 in its locking direction, and then, wrench turning the cam lock ring 50 to refusal in its locking direction whereupon the tool 20 becomes positively locked in the tool holder 10. To release the tool 20 from the tool holder 10, the cam lock ring 50 is first loosened by wrench turning the said cam lock ring 50 in its release direction followed by further hand turning the cam lock ring 50 to refusal in its release direction whereupon the said tool 20 becomes completely freed from its securement in the tool holder 10.

Figure 6:
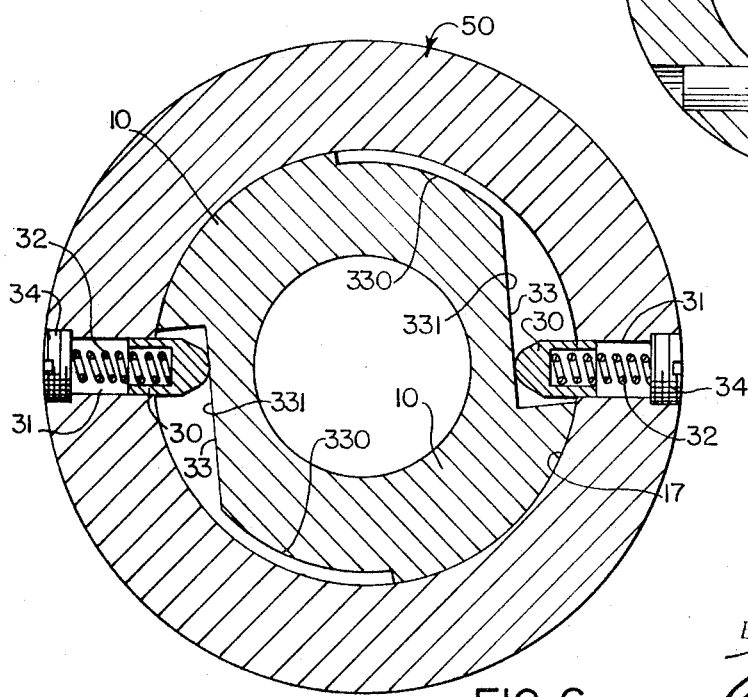
FIG. 6 is a horizontal sectional view taken on the line 6—6 of FIG. 1.

FIGS. 1 and 6 show auxiliary locking elements 30 preferably employed to prevent accidental loosening or back-off of the cam lock ring 50 when the tool 20 is driven in its main drive direction by the tool holder 10 through the mating male and female tapers 21 and 11 of the tool 20 and tool holder 10 respectively.

Referring now particularly to FIG. 6, the locking elements 30 are mounted in diametrically oppositely disposed shouldered bores 31 formed in the cam lock ring 50, and are spring-loaded by compression springs 32 radially inwardly toward and into a preferably 90° cam 33 formed in the outer wall 16 of the tool holder 10. Each said cam 33 is curved at 330 and terminates in a contiguous flat seat 331 substantially as shown in the drawing. A cap screw 34 is threaded in the outer end of the shouldered bores 31 of the cam lock ring 50 to retain the compression springs therein.

The tool 20 is locked by the cams 23 and the parallel locking pins 16 against slippage with respect to the tool holder 10 when driven in its main drive direction, and the said tool 20 is locked by the oppositely disposed reciprocating locking pins 25 with respect to the said tool holder 10 when driven in its reverse direction.

Although but a single embodiment of the instant invention has been disclosed and described in detail herein, it is obvious that many changes may be made in the size, shape, arrangement and detail of the several elements of the invention as defined by the appended claim.

I claim:
1. In combination,
   a. a tool holder having an axially disposed female taper in one end thereof,
   b. a pair of oppositely disposed reciprocating locking pins each having a cam head extending radially outwardly from said tool holder and a locking head extendable axially into said tapered bore,
   c. spring means constantly urging said reciprocating locking pins radially outwardly,
   d. a cam lock ring turnable to an unlocked or locked position opposite compound locking cams formed therein mounted on said tool holder with the cam heads of said reciprocating locking pins disposed in said compound locking cams of said cam lock ring,
   e. each compound locking cam having a rapid-rise portion and a contiguous slow-rise portion, each said rapid-rise portion being so located that its deep end substantially freely overlies the cam head of one of said reciprocating locking pins when said cam lock ring is turned to its unlocked position,
   f. a pair of fixed oppositely disposed locking pins extending through said tool holder near the bottom thereof, each presenting a central portion thereof exposed within the female taper in a plane below the plane occupied by said reciprocating locking pins,
   g. a pair of spring loaded axially inwardly urged pins carried by said cam lock ring located in a plane above said reciprocating locking pins and engaging said tool holder at a combined arcuate groove and contiguous seat formed therein,
   h. a cam lock retainer pin carried by said cam lock ring extending into a retainer groove formed in the outer periphery of said tool holder located to limit the manual or wrench turning of the cam lock ring to the extent required to perform its function, and
   i. a tool including a male tapered shank formed complementary to the female taper in said tool holder with axially disposed flat portions on each side thereof and having a pair of angularly disposed opposite locking cams formed at the base of said flat portions and extending partially around said tapered shank therefrom,
   j. the locking cams of said tool shank engaging the fixed locking pins of said tool holder to lock said tool in said tool holder when said tool shank is inserted in to the tool holder taper and turned a partial turn with respect to said tool holder,
   k. the said reciprocating locking pins engaging first the rapid-rise portion of said compound cam when said locking ring is initially manually turned in its "lock" direction followed by said reciprocating locking pins engaging the contiguous slow-rise portion of said compound cams responsive to additional wrench turning of said locking ring.

* * * * *